United States Patent [19]

Marsee

[11] 4,086,892
[45] May 2, 1978

[54] FUEL INDUCTION SYSTEM

[75] Inventor: Frederick J. Marsee, Clawson, Mich.

[73] Assignee: Ethyl Corporation, Richmond, Va.

[21] Appl. No.: 692,734

[22] Filed: Jun. 4, 1976

Related U.S. Application Data

[63] Continuation of Ser. No. 508,087, Sep. 23, 1974, Pat. No. 3,972,324, and Ser. No. 498,960, Aug. 20, 1974, Pat. No. 3,971,352, which is a continuation-in-part of Ser. No. 439,912, Feb. 6, 1974, abandoned.

[51] Int. Cl.² .......................................... F02M 31/00
[52] U.S. Cl. ...................... 123/122 AC; 123/122 AB
[58] Field of Search ................ 123/122 AC, 122 AB, 123/122 AA, 133, 127, 122 R, 122 A, 141, 52 MV; 48/180 R

[56] References Cited

U.S. PATENT DOCUMENTS

| 1,676,955 | 7/1928 | Kemp | 123/122 AC |
|---|---|---|---|
| 1,848,620 | 3/1932 | Godward | 48/180 R |
| 3,607,155 | 9/1971 | Faltermeier | 123/141 |
| 3,941,106 | 3/1976 | Kobayashi | 123/122 AC |

Primary Examiner—Ronald H. Lazarus
Attorney, Agent, or Firm—Donald L. Johnson; Robert A. Linn; Joseph D. Odenweller

[57] ABSTRACT

A fuel induction system for a spark-ignited multicylinder internal combustion engine including a carburetor, a mixing chamber and an intake manifold. The carburetor includes a primary barrel which connects initially to an inlet in the mixing chamber. An outlet from the mixing chamber connects to the intake manifold. The inlet and outlet are arranged such that the direction of air/fuel mixture flow is reversed in passing through said inlet and outlet thereby providing an improved air/fuel mixture, resulting in lower exhaust hydrocarbon and carbon monoxide emission.

5 Claims, 5 Drawing Figures

4,086,892

FUEL INDUCTION SYSTEM

CROSS REFERENCE TO RELATED APPLICATIONS

This application is a continuation of application Ser. No. 508,087, filed Sept. 23, 1974, now U.S. Pat. No. 3,972,324 and application Ser. No. 498,960, filed Aug. 20, 1974, now U.S. Pat. No. 3,971,352 which in turn is a continuation-in-part of application Ser. No. 439,912, filed Feb. 6, 1974, now abandoned.

BACKGROUND

Of recent years there has been a trend toward operating spark-ignited internal combustion engines at leaner air/fuel ratios in order to decrease the amount of hydrocarbon and carbon monoxide in the exhaust. One limiting factor in going towards leaner operation is gasoline maldistribution from cylinder-to-cylinder. The inducted air/fuel ratio must be kept lean enough such that the cylinder supplied with the leanest mixture will still fire, otherwise exhaust hydrocarbon and carbon monoxide emission will increase rather than decrease. The problem is most acute when the choke is first moved to the open or off position because, at that time, the carburetor and associated hardware are not up to operating temperature and much of the inducted gasoline remains in liquid form causing excessive maldistribution.

Several methods have been proposed to minimize the problem. According to one method the entire intake manifold on which is mounted the primary venturi carburetor is heated by providing an exhaust gas jacket around the intake manifold (Bartholomew, "Potentialities of Emission Reduction by Design of Induction Systems," S.A.E. Meeting January 1966, Detroit, Mich.). According to another method a "hot spot" is provided in the intake manifold directly below the primary venturi. This is accomplished by having a thin sheet metal plate separate the exhaust cross-over from the intake manifold at this location (W. D. Bond, "Quick-Heat Intake Manifolds for Reducing Cold Engine Emission," S.A.E. Meeting October 1972, Tulsa, Okla.). Both of these methods are effective but do not eliminate the problem.

Other related induction systems resulting from a prior art search and listed in chronological order are:

Kambak, U.S. Pat. No. 1,479,547 (1924) which discloses an induction system in which liquid fuel is delivered into a bulbous chamber located in the exhaust manifold. The liquid fuel is vaporized and then mixed with air which is inducted through separate means.

Maroger, Fr. Pat. No. 629,582 (1926) which discloses an exhaust-jacketed heat exchanger placed between the carburetor and the engine intake.

Mock, U.S. Pat. No. 1,777,472 (1930) which employs a thin wall "hot spot" in the carburetor adjacent to the power jet to assist in vaporization of excess gasoline inducted during acceleration.

Duthoit, U.S. Pat. No. 2,066,720 (1937) which discloses an updraft carburetor in which the air/fuel mixture is conducted through a bulbous conduit which extends transversely through the exhaust manifold.

Titus, U.S. Pat. No. 2,720,197 (1955) which discloses a liquid-heated heat exchanger installed between the carburetor and the intake manifold.

Summers, U.S. Pat. No. 3,016,051 (1962) disclosing a two-barrel induction system for a V-type engine which includes a U-tube which connects the two separate branches of the intake manifold. The U-tube extends into the exhaust cross-over.

Fisher, U.S. Pat. No. 3,797,468 (1974) discloses a heatexchanger installed between a carburetor and an intake manifold.

SUMMARY OF THE INVENTION

Fuel maldistribution in spark-ignited multicylinder engines is significantly reduced by inducting the air/fuel mixture from a primary carburetor barrel into a box-like mixing chamber. The mixing chamber connects through one or more outlets to the intake manifold, which in turn connects to the intake ports of each of the engine cylinders. The inlet and outlet of the mixing chamber are arranged such that the primary air/fuel mixture undergoes a reversal in flow direction in passing from the inlet to the outlet. The mixing chamber may be heated by providing it with a jacket through which hot engine coolant or exhaust gas circulates. The mixing chamber may be placed in an exhaust flow path such as in the exhaust cross-over.

DESCRIPTION OF THE PREFERRED EMBODIMENTS

Figure 1:
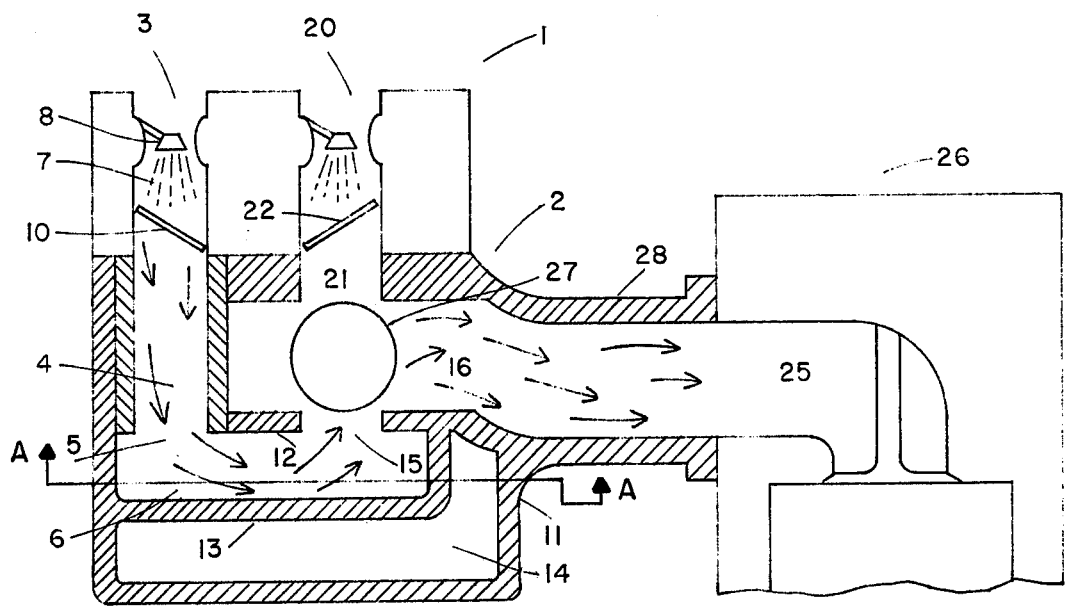
FIG. 1 is a cross-section of a two-barrel carburetor including a mixing chamber for the primary air/fuel mixture.

In FIG. 1, two-barrel carburetor 1 is mounted on intake manifold 2. Primary barrel 3 connects by passage 4 through inlet 5 directly into mixing chamber 6. Gasoline is atomized into air passing through venturi section 7 by nozzle 8. Air/fuel flow is controlled by throttle valve 10.

Mixing chamber 6 is rectangular in shape and is defined by side wall 11, top wall 12, which is also the bottom wall of a portion of intake manifold 2, and by bottom 13. Engine coolant jacket 14 surrounds a portion of mixing chamber 6. Passage 4 opens downwardly through inlet 5 and outlet 15 opens upwardly into the interior 16 of intake manifold 2.

Secondary barrel 20 connects through passage 21 into interior 16 of intake manifold 2 at a location directly opposite outlet 15. Flow of secondary air/fuel mixture through barrel 20 is controlled by secondary throttle valve 22.

Intake manifold 2 connects through lateral 28 to an intake port 25 of each cylinder of engine 26. Runner 27 extends fore and aft to deliver air/fuel mixture through laterals to each of the remaining multicylinders (not shown).

In operation, the engine is started and draws air through primary barrel 3 into which gasoline is atomized by nozzle 8. The primary air/fuel mixture passing down passage 4 enters mixing chamber 6 through inlet 5. It then reverses direction and exits through outlet 15.

The extreme turbulence caused by the reversal in direction results in a homogenous air/fuel mixture.

As described and shown in the drawings, the air/fuel mixture initially flows downwardly and reverses direction to exit upwardly. Of course, the reversal in direction can be achieved by having an updraft carburetor inducting through the bottom of a mixing box and then discharging the homogenized air/fuel mixture downwardly into the intake manifold. Likewise, the carburetor may be a side-draft type, in which flow direction is in a substantially horizontal plane. The essential feature in all cases is that the air/fuel mixture enters the mixing box in one direction and exits the mixing box in a substantially reverse direction.

The size of the mixing box can vary over a wide range, for example, the box may have a volume which is 1–10 percent of the engine displacement. Best results have been obtained when the volume of the mixing box is about 3 to 6 percent of the engine displacement. In this embodiment, the mixing box and additional air/fuel passage served to increase the overall volume of the original induction system by 10–20 percent.

Primary air/fuel mixture flows upwardly through outlet 15 into the interior 16 of intake manifold 2. The air/fuel mixture is distributed fore and aft through runners 27 and conducted to each intake port 25 through laterals 28.

During periods of high engine load, secondary throttle valve 22 opens to deliver secondary air/fuel mixture down through secondary barrel 20 and passage 21 into the interior 16 of intake manifold 2. Preferably, passage 21 is at the same location longitudinally with respect to fore and aft runner 27 as is outlet 15. In FIG. 1, passage 21 is located directly opposite outlet 15 such that air/fuel mixture passing up through outlet 15 impinges with any fluid entering through passage 21. This improves mixing during high engine load when secondary throttle valve 22 is open and eliminates fore and aft imbalance in air/fuel ratio at idle and lower engine speed which can be caused by air leaking past secondary throttle valve 22 in the closed position.

Figure 3:
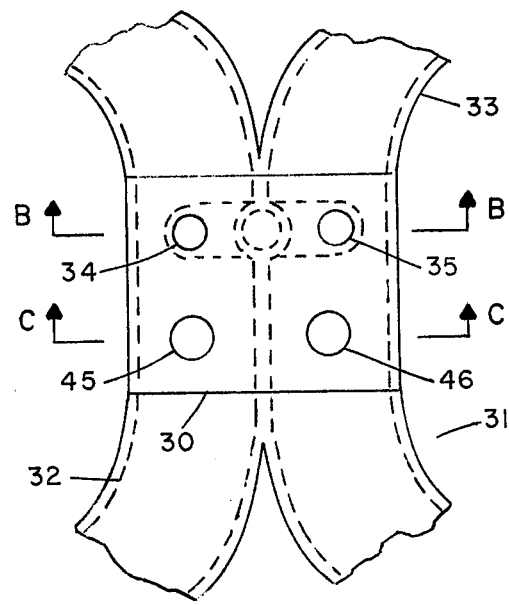
FIG. 3 is a top view of a four-barrel carburetor mounted on an intake manifold having two sets of runners.
Figure 4:
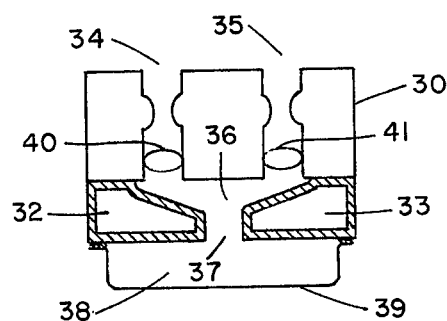
FIG. 4 is a cross-section taken at BB showing the two primary barrels connected to a mixing chamber.
Figure 5:
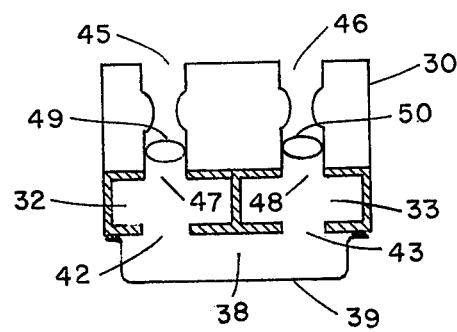
FIG. 5 is a cross-section taken at CC showing the outlets from the mixing chamber and the two secondary barrels connected to each set of intake runners.

FIGS. 3-5 show an embodiment of the new induction system adapted for use with a V-type multicylinder engine. Four-barrel carburetor 30 is mounted directly on intake manifold 31, which is constructed of two sets of runners 32 and 33, each of which is connected to a different one-half of the engine cylinder intake ports. Primary carburetor barrels 34 and 35 connect through T-passage 36 down through inlet 37 into mixing chamber 38 which, in this embodiment, is a rectangular bowl-shaped member 39. Primary throttle valves 40 and 41 control air/fuel flow through primary barrels 34 and 35. Each barrel has a fuel nozzle (not shown) for atomizing gasoline to form an air/fuel mixture.

Outlets 42 and 43 form a passage from mixing chamber 38 upwardly into intake runners 32 and 33. Secondary carburetor barrels 45 and 46 connect downwardly through openings 47 and 48 into intake runners 32 and 33 at a location directly above outlets 42 and 43. Fluid flow through secondary barrels 45 and 46 is controlled by secondary throttle valves 49 and 50.

In operation, the engine is started causing air to be inducted downwardly through primary barrels 34 and 35, forming an air/fuel mixture by induction of gasoline through nozzles (not shown). The primary air/fuel mixture is conducted by T-passage 36 through inlet 37 into mixing chamber 38, forming a common homogenous air/fuel mixture. The resultant primary air/fuel mixture reverses direction in mixing chamber 38 and passes upwardly through outlets 42 and 43 into intake runners 32 and 33. Each of intake runners 32 and 33 extends fore and aft and is adapted to deliver an air/fuel mixture to a different one-half of the engine cylinders.

During periods of high engine load, such as occur during rapid acceleration, secondary throttle valves 49 and 50 open, causing a secondary air/fuel mixture to be inducted through secondary barrels 45 and 46 through openings 47 and 48 into intake runners 32 and 33. This secondary air/fuel mixture enters intake runners 32 and 33 at a location directly opposite the location at which the primary air/fuel mixture enters through outlets 42 and 43. This causes the primary and secondary air/fuel mixtures to impinge in intake runners 32 and 33, which further improves air/fuel mixing. In addition, because of the location of openings 47 and 48 at substantially the same longitudinal location in runners 32 and 33 as outlets 42 and 43, any air leaking by secondary throttle valves 47 and 48 during idle or other periods when throttle valves 47 and 48 are closed will dilute the primary air/fuel mixture equally in both directions fore and aft in intake runners 32 and 33, eliminating any imbalance of the air/fuel ratio.

Other preferred embodiments in which hot engine exhaust gas is used to heat the mixing chamber are described in my application Ser. No. 498,960, filed Aug. 20, 1974, which is a Continuation-in-Part of application Ser. No. 439,912, filed Feb. 6, 1974, now abandoned. Another preferred embodiment in which the mixing chamber is inserted through an opening in an exhaust gas conduit into the exhaust flow path is described in my application Ser. No. 498,951, filed Aug. 20, 1974.

Figure 2:
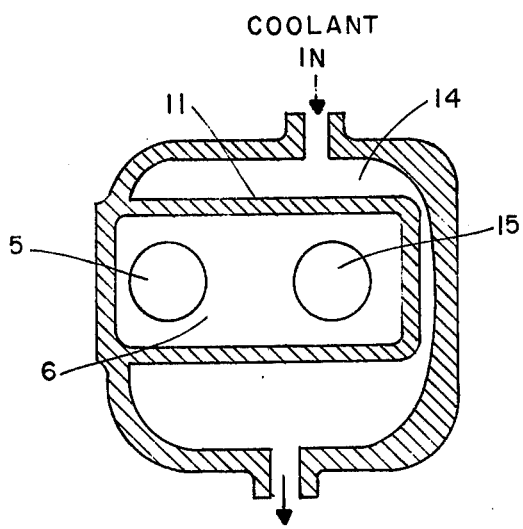
FIG. 2 is a cross-section of the mixing chamber of FIG. 1 taken at AA.

Measurements were made of the actual cylinder-to-cylinder air/fuel distribution in a 2.3 liter 4-cylinder Pinto fitted with an induction system substantially as shown in FIGS. 1 and 2. The box had a volume of about 0.07 liters. The air/fuel ratio was measured at each cylinder at idle, 30 mph and 50 mph. Normally an air/fuel ratio spread of one number would be expected. The results were as follows:

|        | Air/Fuel Ratio at Cylinder | | | |
|--------|------|------|------|------|
|        | 1    | 2    | 3    | 4    |
| idle   | 15.1 | 15.1 | 15.1 | 15.1 |
| 30 mph | 16.6 | 16.7 | 16.5 | 16.6 |
| 50 mph | 17.5 | 17.2 | 17.2 | 17.1 |

At idle all cylinders were identical. Evan at 50 mph the maximum spread was 0.4. This even distribution is extremely beneficial because, as mentioned earlier, the air/fuel of the leanest cylinder must be high enough to fire or the use of lean air/fuel ratios will increase rather than decrease exhaust hydrocarbon and carbon monoxide emission. By use of the present induction system very lean air/fuel mixtures can be used without engine misfire.

The above Pinto was subjected to 1975 Federal CVS emission tests with the following results.

| Hydrocarbon | 1.1 g/mi |
| Carbon Monoxide | 10.0 g/mi |
| $NO_x$ | 2.0 g/mi |

The above emission level passes the 49 state (excluding California) 1975 Federal emission standards without use of expensive catalysts.

I claim:

1. A fuel induction system for a spark-ignited multicylinder internal combustion engine, said system comprising in combination carburetor means, a mixing chamber defined by a non-perforate bottom wall and non-perforate side walls and a top wall and intake manifold means, said carburetor means having at least one primary barrel in which gasoline is inducted into air to form a primary air/fuel mixture, said primary barrel being operatively connected to an inlet in said top wall of said mixing chamber, said manifold means comprising two sets of intake runners, each of said sets being adapted to deliver an air/fuel mixture to a different one-half of said multicylinders, said mixing chamber having two outlets in said top wall, each of said outlets being operatively connected to a different one of said two sets of intake runners, whereby each of said two sets of intake runners receives an air/fuel mixture from a common mixing chamber which mixture has been thoroughly mixed by the turbulence caused by reversal in direction of flow in said mixing chamber.

2. A fuel induction system of claim 1 wherein said carburetor means comprises two primary barrels each of said primary barrels being operatively connected to an inlet in the top wall of said mixing chamber whereby the primary air/fuel mixture from each of said primary barrels forms a common air/fuel mixture.

3. A fuel induction system of claim 1 wherein said fuel induction system includes means for heating said mixing chamber.

4. A fuel induction system of claim 3 wherein said heating means comprises locating said mixing chamber in an exhaust conduit of said engine.

5. A fuel induction system of claim 4 wherein said exhaust conduit is the exhaust crossover of a V-type engine.

* * * * *